June 10, 1952  A. G. BURNS  2,599,541
ELECTRIC ANIMAL TRAP AND REACTIVATOR
Filed Nov. 3, 1948
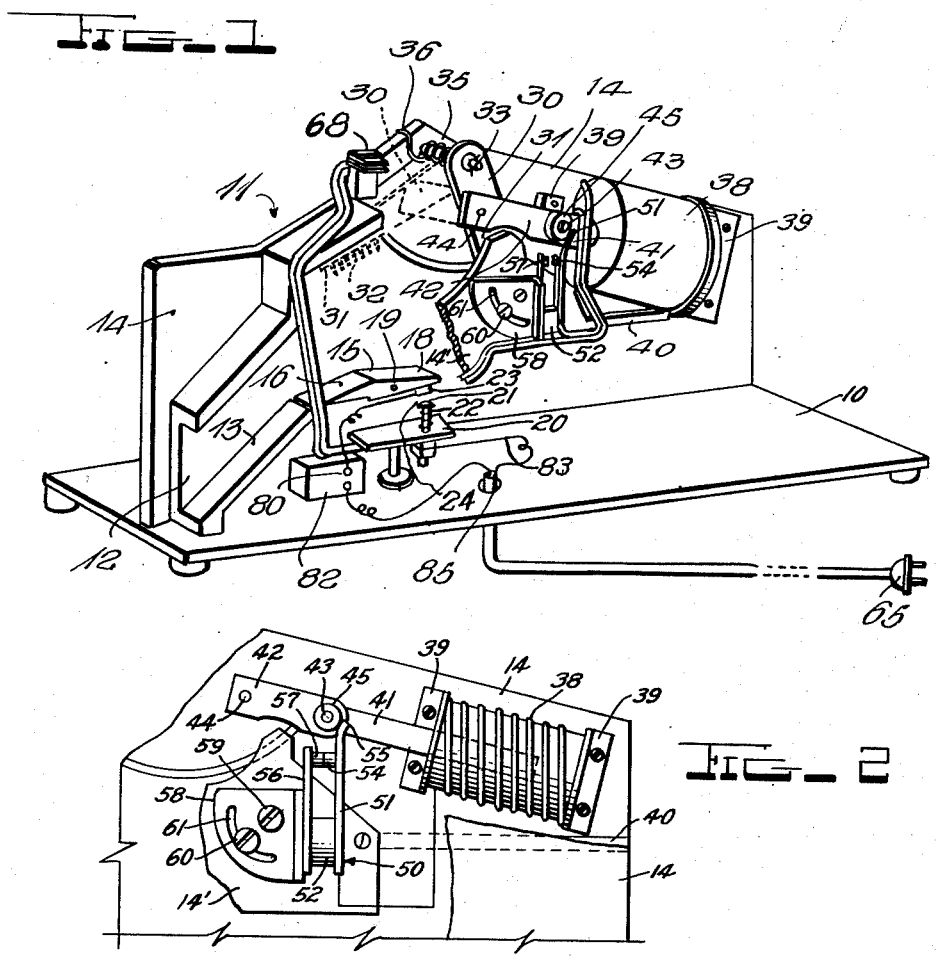
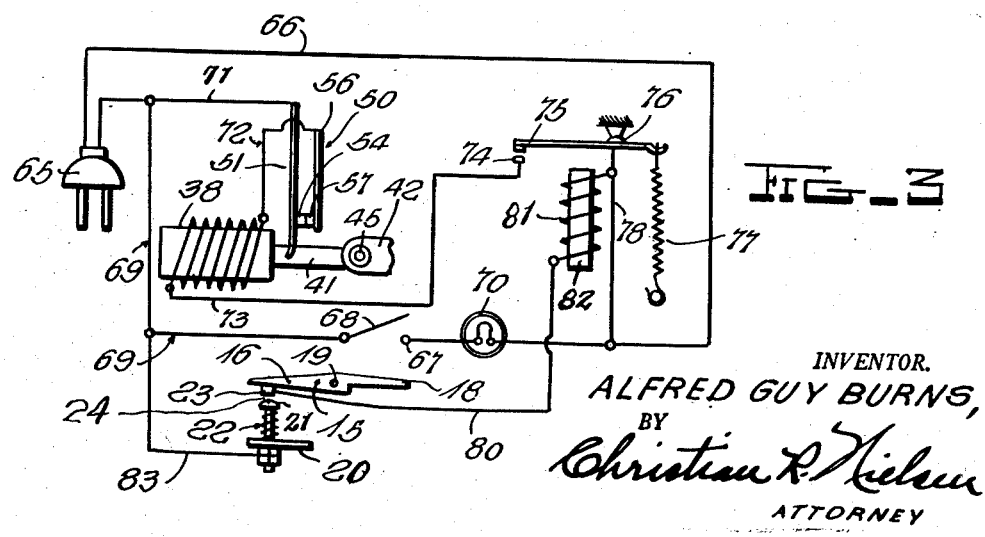
INVENTOR.
ALFRED GUY BURNS,
BY
Christian R. Nielsen
ATTORNEY Patented June 10, 1952

2,599,541

UNITED STATES PATENT OFFICE 2,599,541

ELECTRIC ANIMAL TRAP AND REACTIVATOR

Alfred G. Burns, Farmland, Ind.

Application November 3, 1948, Serial No. 58,037

1 Claim. (Cl. 43—75)

This invention relates to an animal trap of an automatic electric type, and is an improvement of my trap described and claimed in an application filed April 17, 1945, Serial Number 588,770, now Patent No. 2,476,806.

It is an object of the invention to provide an animal trap of the everset type, in which the rodent is quickly destroyed and ejected into a compartment, after which the actuating mechanism is automatically returned to an operative position for the next animal that enters the trap.

Another object of the invention is the provision of an animal trap of the everset type in which a striking device is employed for killing the animal entering the trap, with a rockable platform adapted to be contacted by said animal for closing a switch in a circuit to a solenoid that causes actuation of the striking device, a second switch in the circuit being opened when the energized solenoid has moved the striking device to its operative limit so that a spring will return the striking device to a reset position, said first-mentioned switch being closed again if the animal recontacts the rockable platform so that the striking device will become active, kill the animal and eject said animal from the platform and into a special compartment.

A further object of the invention is the provision of an animal trap of the everset type in which a striker arm is suddenly drawn in one direction by an armature of a solenoid when an animal steps upon a rockable platform which closes a switch to an electric circuit that includes the solenoid, a switch delaying closing of the circuit sufficiently so that a spring may return the striker arm to a reset position, said arm being reactivated by the armature when the animal has not cleared the rockable platform for striking said animal and ejecting it from the platform.

The invention consists in the novel construction, arrangement and combination of parts hereinafter more particularly described and claimed.

In the drawings:

Figure 1 is a view in perspective of my animal trap with parts broken away to show the interior mechanism;

Figure 2 is a fragmentary enlarged view in elevation of a mechanism for opening a switch to a solenoid circuit; and Figure 3 shows diagrammatically a wiring circuit for the trap.

Referring more particularly to the drawings, 10 designates a base member upon which is mounted a housing generally indicated by the numeral 11. An entrance 12 leads to an entrance ramp 13 which is enclosed on all sides by the walls 14 and 14 of the housing. Said walls 14 and 14 are secured rigidly to the base 10.

A rockable platform 15 has one end 16 resting upon the inner end of the ramp 13 and is substantially the same width as the ramp in order to direct the animal inwardly toward the tiltable end 18 of the platform. The platform is supported intermediate its ends by an axle 19 which has bearings in the side walls of the housing. An insulated bracket 20 mounts a headed pin contact 21, in the present instance, the contact having a helical spring 22 interposed between the head and the bracket 20 for maintaining the contact in raised position. A contact 23 carried by the platform 15 cooperates with the contact 21 as a switch 24.

A striking arm 30 has a head 31 provided with teeth 32 at the free end of said arm. This arm is pivoted at its other end on a rod 33 carried by one side wall 14 of the housing. A coiled spring 35 has one end 36 engaged around one of the walls 14 while the other end is secured to the upper end of the arm 30 for returning the arm to the re-set position shown in dotted lines.

A solenoid 38 is attached to one of the side walls 14 by angle irons 39 and has its outer lower end seated on a shelf 40 projecting from bracket 14'. The longitudinal axis of the solenoid as well as an armature 41 are inclined at an acute angle to a horizontal. A link 42 is pivotally connected at one end by a pin 43 to the outer end of the armature. The other end of the link is pivotally connected at 44 to an intermediate portion of the arm 30. An insulating roller 45 is mounted on the pin 43.

A reactivator switch 50 includes a spring member 51 secured to a block 52 attached to the bracket 14' of the housing. A contact 54 is connected to the member 51 inwardly of a curved finger 55 at the free end of the spring member and this finger is adapted to be engaged by the insulating roller 45 for a purpose which will be presently explained.

A second member 56 has a contact 57 normally engaging the contact 54 to close the circuit to the solenoid. The member 56 is carried by a segment 58 pivoted at 59 on a bracket 14' fixed between the walls 14 and 14. A bolt 60 is threaded into an opening in the bracket 14' and is received by a curved slot 61 in the segment. The angular movement of the segment is adapted to regulate the position of the contact 57 relative to the contact 54 when desired or necessary.

Referring more particularly to the diagram in Figure 3, it will be seen that a plug 65 is provided which is adapted to be inserted into a socket of the house current. A wire 66 extends to a contact 67 of a manually operated switch 68. A wire 69 returns to the plug. A lamp 70 is incorporated in the wire 66 and will be lighted when the switch 68 is closed.

A wire 71 connects the contact 54 with the return wire 69. The coil of the solenoid is connected by a wire 72 with the contact 57 through the metal member 56. The coil of the solenoid is connected by a wire 73 with a contact 74 of a switch 75 which is pivoted at 76 and maintained in open position by a spring 77. A wire 78 connects the conduction switch arm 75 with the wire 66.

The rockable platform 15 acts as a switch when said platform is depressed to cause the contacts 21 and 23 to engage. The contact 23 is connected by a wire 80 with the coil 81 of a relay 82. A wire 83 connects the contact 21 with the wire 69. The other end of the coil 81 is in communication with the wire 78.

The operation of the trap is automatic and is as follows: When an animal enters the ramp 13 and reaches the rockable platform 15, the free end of the platform is depressed, closing the circuit to the relay 82 and to the solenoid 38. When the switch 75 is closed by the relay, the solenoid will withdraw the armature 41 causing the striker arm to be pulled backward rapidly so the head 31 will forcibly hit the animal which, if killed, by the blow, will be ejected from the platform and the arm 30 will be returned to its reset position by the spring 35.

If, on the other hand, the animal is not killed, it will again contact the platform and the striker arm is again swung inwardly and strikes the animal. The arm is periodically returned with a striking force until the animal is exterminated and ejected from the platform.

Each time the arm 30 is moved by the solenoid, the insulated roller 45 contacts the spring arm 51 of the switch 50 and moves said arm and the contact 54 away from the contact 57, thereby breaking the circuit to the solenoid so that the spring 35 can return the arm 30 to its inoperative position above the inner end of the ramp, as shown in dotted lines in Figure 1 if the animal has not been ejected.

However, if the animal enters the trap sufficiently to reach the rockable platform and turns around on the platform in an attempt to escape and sets the mechanism in operation, the arm 30 will strike his hips and throw him partly into a compartment or drawer. At this time the insulated roller 45 will open the reactivator switch 50, thereby interrupting the circuit to the solenoid and permitting the spring 35 to return the arm. When the switch 50 is closed by the release of the spring arm 51 from the roller 45 and the arm 30 has been returned, said arm will again be drawn downwardly to strike the animal and clear the platform. The reactivator switch 50 will be closed periodically until the animal has been killed and forced from the platform. When this happens, the trap will be fully reset for another animal.

When the switch 68 is closed the lamp 70 will be lit. The current of the lamp is carried by the wires 66 and 69 and is therefore shunted around the solenoid 38 and the relay 82. When the switch composed of the contacts 23 and 21 is closed by the rocking of the platform 15, current will pass through the wires 66, 78, the coil 81 of the relay and the wires 69, 80 and 83, causing said relay to act on the spring-pressed arm 75, thereby closing the circuit to the solenoid since the reactivator switch 50 is normally closed. The relay acts immediately on the arm 75 so that the circuit to the solenoid is closed, when the switch 50 is closed. A slightly delayed action of the switch 50 permits the arm 30 to be returned by the spring 35 so that the arm may have its full striking power at all times. In other words, there is a slight interval between the time when the roller 45 releases the spring member 51 of the switch 50 and time when the spring 35 is returning the arm to its rest position. The switch 50 delays the closing of the circuit to the solenoid during this time interval. Nevertheless, when the platform has been cleared, the circuit of the solenoid is broken.

It will be noted that the wires from the plug 65 which is located exteriorly of the housing 11 are inserted through an opening 85 in the base 10. The space between the bottom of the housing and the base adjacent the relay 82 is utilized for the various wires of the circuit.

I claim:

In an automatic everset electrical animal trap wherein a housing embodies an entrance ramp, a rockable platform, a swinging striker arm above the platform and means for imparting intermittent delayed swinging movement to the striker arm comprising an electrical source having a contact engageable by a contact on said rockable platform, a relay in circuit with said last named contact, said relay having a spring tensioned switch arm, a solenoid having a contact engageable by said switch arm, said solenoid further having an armature operatively connected to said striker arm, and a normally closed reactivator switch in circuit with the solenoid and said electrical source, said reactivator switch having a spring member movable upon movement of the armature in one direction to break the circuit to the solenoid and said relay.

ALFRED G. BURNS.

REFERENCES CITED

The following references are of record in the file of this patent:

UNITED STATES PATENTS

| Number | Name | Date |
| --- | --- | --- |
| 829,511 | Davis | Aug. 28, 1906 |
| 841,975 | Irving | Jan. 22, 1907 |
| 979,637 | Backer | Dec. 27, 1910 |
| 1,052,957 | Pryor | Feb. 11, 1913 |
| 1,403,767 | Goff | Jan. 17, 1922 |
| 2,472,806 | Burns | June 14, 1949 |